Oct. 27, 1953

C. C. CLOUGH 2,656,732

REMOTE-CONTROL MECHANISM FOR TANK TRUCKS

Filed Oct. 19, 1951

INVENTOR.
CARROLL C. CLOUGH
BY
Reynolds, Beach + Christensen
ATTORNEYS

Oct. 27, 1953

C. C. CLOUGH 2,656,732

REMOTE-CONTROL MECHANISM FOR TANK TRUCKS

Filed Oct. 19, 1951

INVENTOR.
CARROLL C. CLOUGH
BY
Reynolds, Beach & Christensen
ATTORNEYS

Patented Oct. 27, 1953

2,656,732

UNITED STATES PATENT OFFICE 2,656,732

REMOTE-CONTROL MECHANISM FOR TANK TRUCKS

Carroll Clyde Clough, Seattle, Wash.

Application October 19, 1951, Serial No. 252,179

4 Claims. (Cl. 74—469)

Tank trucks such as are used for delivering fuel oil to the tanks of users ordinarily have assembled in a compartment at the rear end a reel for the hose, a pump to effect delivery through that hose, and various gauges, valves, and controls. It is customary to drive the pump during delivery, and the reel after completion of delivery, by means of a jack shaft extending to the rear end compartment from the power take-off of the truck engine's transmission.

It is undesirable to permit the pump, when not actually delivering, to continue to run and to bypass its entire output, and particularly is this undesirable when the speed of the jack shaft is of reasonably high value, as it sometimes is during delivery from the pump. However, it has been difficult to avoid this in actual practice, for the reason that the controls whereby the power take-off could be engaged and disengaged, respectively, as well as the throttle control for the engine's speed, have been located in the cab, whereas the driver, who is ordinarily the sole attendant, during initiation of delivery is necessarily stationed at the rear end of the truck, and his duties during delivery make it difficult for him to leave the nozzle. In order to effect engagement or disengagement of the power take-off, or to effect any change from time to time of the engine's speed, it would be necessary for the attendant to leave the rear end, climb into the truck's cab, declutch the engine and shift the power take-off control lever into or out of driving position, occasionally adjust a hand throttle, and each time go back to the rear end, repeating that process from time to time as change is required. The attendant will not do this as a practical matter.

The control operations involved consist, at a minimum, of declutching the regular transmission from the truck's engine, and while it is declutched effecting shifting of the control lever of the power take-off into position wherein the driving gear of the power take-off meshes with the driven gears leading to the jack shaft. There must be similar declutching during movement of the control lever of the power take-off into unmeshed position, to terminate the drive to the jack shaft. It is also desirable in most cases to vary or regulate to a fine degree the throttle control to the truck's engine, to obtain exactly the required engine speed and pump speed, or reel speed.

Means have been devised heretofore for the regulation of the truck engine's speed from the truck's rear end; see the copending application of George T. O'Brian, Serial No. 168,619, filed June 16, 1950. That, however, constitutes only a partial solution to the problem, if the attendant must still climb into the cab and depress the clutch pedal while he is effecting a shifting of the power take-off control lever into position corresponding to the meshed position of the power take-off drive gears, and from that position during unmeshing.

According to the present invention there is provided a coordinated control for the engine clutch, operating in this instance by connection to the clutch pedal, and for the power take-off, by way of the latter's control lever, whereby from a remote station, at the rear end of the tank truck, and by the operation of a single control device, the clutch pedal may be depressed to effect declutching of the engine from its transmission and hence from the power take-off, and simultaneously the control lever of the power take-off may be shifted alternately into meshed and into demeshed position. Thus, by successive identical operations of the control device, if the jack shaft is not being driven it may be connected for driving through the power take-off, with coincident momentary declutching of the engine's clutch, and when the jack shaft is being driven the same operation will effect shift of the control lever of the power take-off mechanism into demeshed position, accompanied by simultaneous and momentary declutching of the engine's clutch.

The provision of mechanism to the ends above constitutes the primary object of this invention.

A further object is to provide mechanism of the nature indicated which may be manufactured as a unit and which can be applied as an attachment to most trucks now commercially manufactured without change in their or its construction, and which may be readily adapted by a slight change in assembly to the few makes of truck which, being differently arranged, are not susceptible of immediate connection to the standard form of the attachment, and can be applied to these few makes with no change in their construction.

It is, of course, a further object to provide mechanism of the general nature which will be simple, rugged, and relatively inexpensive, and thoroughly reliable in operation.

More specifically, it is an object to provide in such mechanism an actuator, a connection thence to the clutch pedal, and a companion connection to the power take-off control mechanism, the latter including a reversible member with a snap-over device, by means of which with each actuation of the actuator the control lever of the power take-off will be thrown, one time into meshed position and the next time into demeshed position, and so on, alternately, although the clutch will be declutched by the first such connection with each shift, into whichever position, of the control lever.

With these and similar objects in mind, as will become apparent hereinafter, the present invention comprises the novel control mechanism for application to such trucks and for connection to the various operating parts of the truck, as shown in the accompanying drawings and as will be hereinafter more fully described and claimed.

In the accompanying drawings the invention is shown embodied in one form of construction, such as is applicable to most makes of trucks, and it is shown alone and in its assembled relationship with the truck and its elements.

Since there is a connection between the actuator and the clutch pedal which effects declutching operation of the clutch pedal with each actuation of the actuator, it is a further object to provide in that connection lost motion means, whereby the clutch pedal when depressed by the driver during normal running of the truck will not be impeded by nor require movement of the actuator and its associated parts.

Figure 2:
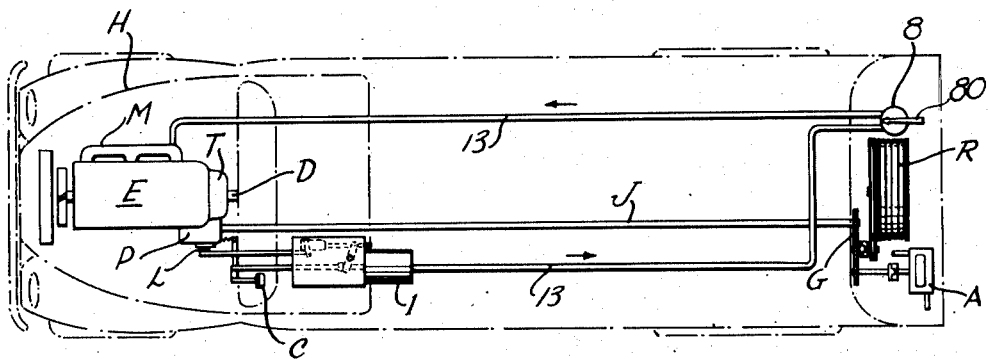
Figure 2 is a phantom plan view showing the manner of connection and assembly of the device in its relationship to the various elements of the truck.

Referring first to Figure 2, the engine E is located beneath the hood H of the truck and drives the truck's drive shaft D through the clutch and transmission at T, and likewise, when the driving gear (not shown) of a power take-off P is engaged with the driven gears, the same engine E drives the jack shaft J, which extends to the rear end compartment of the tank truck. Control of the truck's clutch incorporated in T is effected through the usual clutch pedal C, and meshing or unmeshing of the gears in the power take-off P is accomplished by shifting of the control lever L from one position to another. It will be understood that such gears may be meshed only when the driving gear is declutched, at T, from the engine E and that they should be unmeshed only while the driving gear is declutched. At the rear end of the tank truck the jack shaft J is provided with an element such as the gear G for driving a delivery pump (not shown), or alternatively a reel R.

Figure 1:
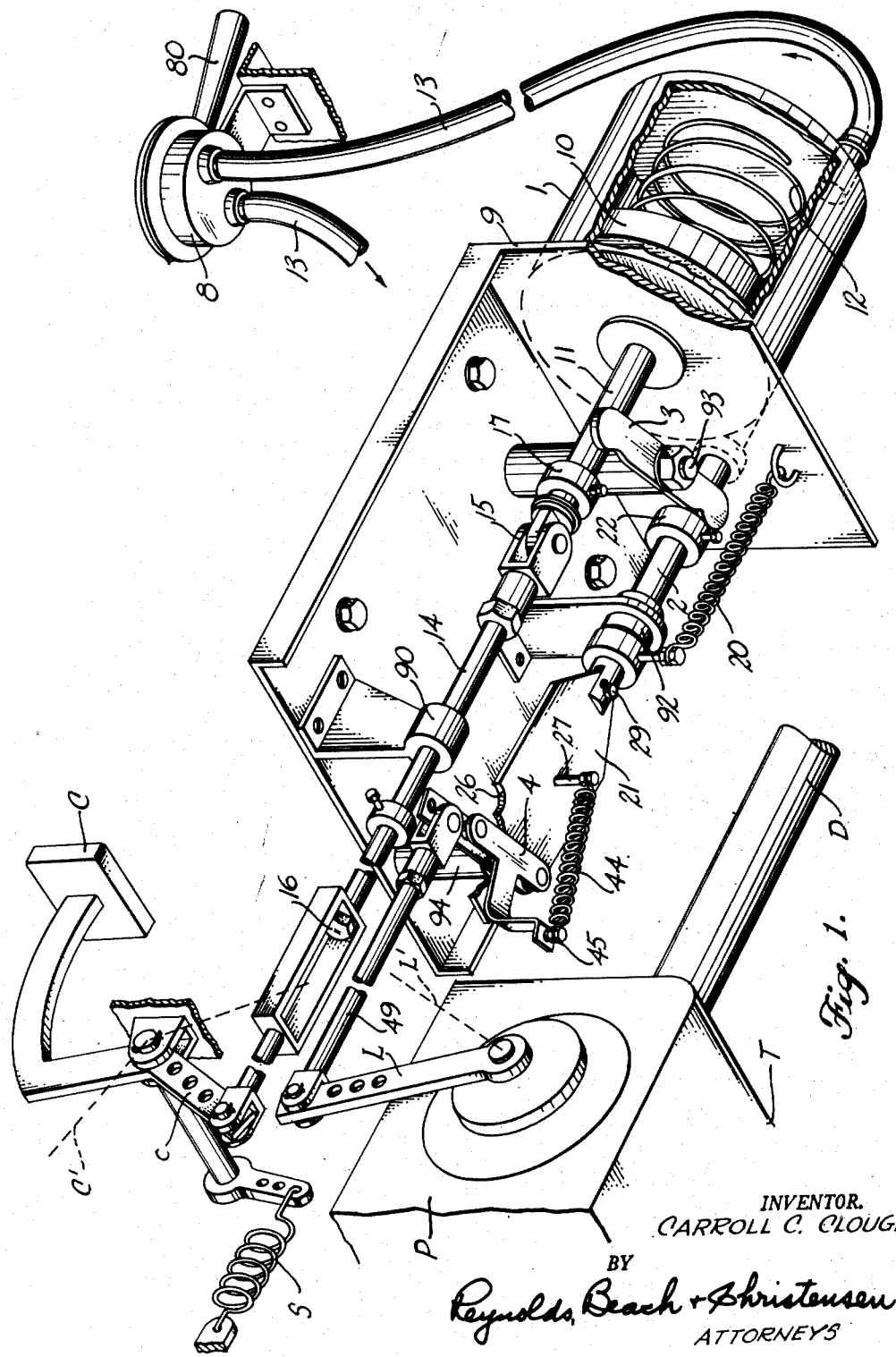
Figure 1 is an isometric view looking upwardly and somewhat rearwardly at the control mechanism, showing it in operative connection to the truck's clutch pedal and to the control lever for the power take-off.

According to the present invention there is added to the clutch pedal C, or to the mechanism which is rocked by that pedal, an extension arm c which by a pull thereon to the rear will effect declutching movement of the clutch pedal, forwardly from the full-line positive of Figure 1 to the dotted line C'. The control lever L for the power take-off, when in its forward position (corresponding to the full-line position of Figure 1), maintains the gears of the power take-off in unmeshed relationship, whereas when it is moved rearwardly to the opposite limit position as shown at L', its gears are meshed.

In order to effect substantially simultaneous and coordinated movement under control, when desired, of the clutch pedal C and of the control lever L, a single actuator is provided in the form of a cylinder 1, a piston 10 reciprocable therein, and its stem 11 projecting forwardly from the cylinder. The cylinder may be conveniently mounted upon a base or bracket 9, whereon are supported various other elements of the control mechanism, and whereby it may be assembled and mounted substantially as a unit upon the truck's chassis. The plunger 10 of the actuator is biased to remain in one limit position, preferably advanced forwardly, and while the clutch-engaging spring S might be relied upon to accomplish this, it is preferred to employ more direct means. Typifying a means to accomplish its return forwardly to this one limit position after its movement rearwardly away therefrom, I have shown a spring 12 within the cylinder 1. Movement away from its normal limit position may be accomplished by various means, but as herein shown a vacuum line 13 extends from the engine's manifold M to the actuator cylinder 1, by way of the on-off control valve 8. This valve is located in the rear compartment of the tank truck, and is simply controlled by a hand lever 80, whereby it may reestablish the normally interrupted connection between the parts of the vacuum line 13, or again break that connection. Whenever the connection is established the plunger 10 of the actuator is subject to suction and is moved away from its normal forward limit position to draw its stem 11 rearwardly. Whenever the vacuum line is interrupted, the plunger, being vented at its opposite face and being subject to the urging of the spring 12 or similar resilient means, is moved to its forward position, similarly moving its stem 11.

The stem 11 may be considered as extending forwardly to a connection to the lever arm c of the clutch pedal C. Preferably it is formed in several connected parts, such as the section 14 guided at 90 from the base 9 for forward and rearward movement and connected by the coupling at 15 to the stem 11, and at 16 there is a lost-motion connection so arranged that following rearward movement of the stem 11, which serves to depress the clutch pedal C, return forward movement of the stem 11, 14 will permit return of the clutch pedal C rearwardly to its normal driving or clutch-engaged position, whereas conversely, during normal driving depression of the clutch pedal C will not require any movement of the stem 11, 14, nor consequently of the plunger 10, nor of any of the parts associated with these elements of the control mechanism.

One of the purposes of the actuator has already been explained, that is, to effect declutching movement of the clutch pedal and its associated parts, and consequent interruption of the drive from the engine E to the transmission T and to the power take-off P. The actautor has a further function, in its control of the power take-off P through its control lever L, which will now be described.

A rod 2 is preferably mounted in parallelism with the stem 11, for reciprocation as a result of reciprocation of the latter. This particular orientation, however, is not essential, and a different orientation would only require appropriate revision of the interconnection between them which is about to be described. In the arrangement shown the rod 2 is guided at 92 in a bracket mounted upon the base 9, for movement in parallelism with the stem 11. It is urged to and held in one limit position, rearwardly drawn, by means of an extension spring 20. Upon it is secured a collar 22, and a cooperating collar 17 is carried by the stem 11. Each of these collars is fixed upon its respective mounting element in the correct position relative to the other, where they can be engaged by or can engage a rocking lever 3 pivoted between its ends at 93 from the base 9, and having one end in position for engaging the collar 17 and the other end in position for engagement by the collar 22. By this arrangement rearward movement of the stem 11 and its collar 17, by energization of the actuator, will rock the lever 3 and effect forward movement, against the resistance of the spring 20, of the collar 22 and its rod 2, but whenever the rod 11 returns to its forward or normal limit position, the rod 2 will be free to return under the influence of the spring 20 to its normal rearwardly withdrawn limit position.

Figure 3:
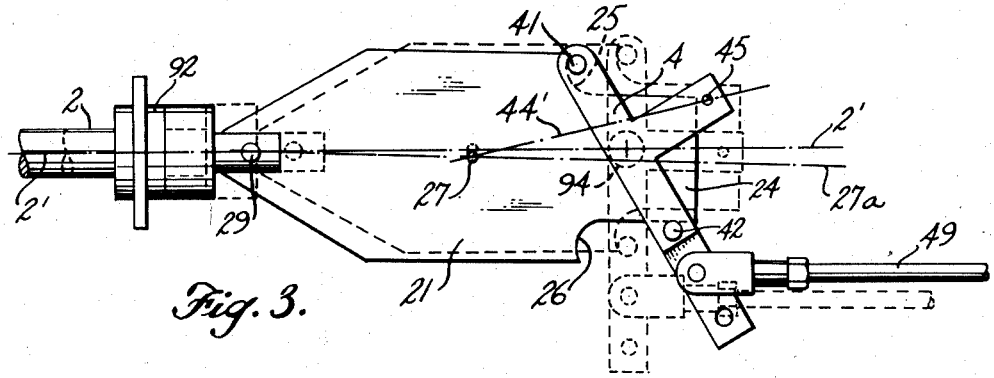
Figure 3 is a plan view and Figure 4 is a similar view, of the reversible member and its snap-over means in successive operating position.
Figure 4:
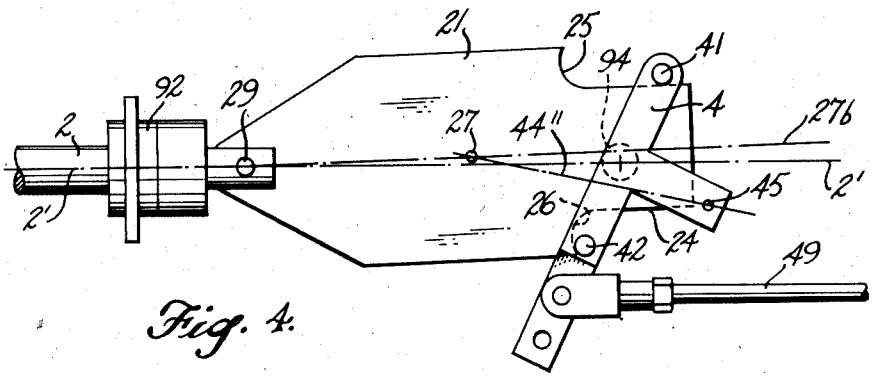

Constituting in effect a forward extension of the rod 2 is a plate 21. As an element of the snap-over device it must rock slightly transversely, hence is pivotally connected at 29 to the forward end of the rod 2. This plate is connected at its forward end to the power take-off control lever L through a reversible and snap-over member which includes a rocking lever 4 pivotally mounted between its ends at 94 from the base 9, but having a portion overlying the plate 21 to mount the two pins 41 and 42 at its opposite ends. The forward portion of the plate 21 is somewhat reduced, as indicated at 24, to fit between the pins 41 and 42 and to permit rocking of the lever 4 between its two limit positions shown, by way of comparison, in full lines in Figures 3 and 4. In either such position the forward extension 24 limits the degree of such rocking, and shoulders 25 and 26 cooperate with the respective pins 41 and 42 to urge the lever 4 to rock about its pivot 94 as the plate 21 is urged forwardly. A spring 44, connected between a pin 27 upon the plate 21 and a forward extension 45 of the lever 4, constitutes part of the snap-over device, and by reason of the slightly offset relation of the pin 27 relative to the axis 2' of the rod 2, caused by rocking of the plate 21 about its pivot at 29, the axis of the spring 44 is thrown alternately to opposite sides of the pivot axis at 94, as the lever 4 reaches a position such as is shown in dash lines in Figure 3, thereby completing rocking of the lever 4 about its pivot mount at 94 by a snap-over action. When this occurs, one or the other of the pins 41 or 42 strikes the edges of the extension 24, and tilts it and its pin 27 to the opposite side of the axis 2', in readiness for the next reversal of the lever 4. In Figures 3 and 4 the axis or line of tension of the spring is indicated by a dot-dash line at 44, in order that the spring may not conceal the mechanism beneath it. To complete the description of this reversible member, the reversible lever 4 is connected by a push-pull rod 49 to the control lever L of the power take-off.

The operation is as follows. It is assumed that the engine E is running, but that the drive shaft D is disconnected therefrom within the transmission T. Whenever the actuator 1, 10 is actuated by turning the valve 8 to the "on" position from its normal "off" position, the stem 11, 14 moves rearwardly, or to the right as shown in Figure 1, thereby depressing the clutch pedal C and declutching the engine E from the transmission T. In its rearward movement with the stem 11 the collar 17 engages the one end of the rocking lever 3 and moves this end rearwardly, rocking the opposite end of the lever 3 forwardly. The latter's movement causes it to engage the collar 22 and thereby to urge the rod 2 forwardly with its plate 21. It can be assumed that parts are normally in the full-line position of Figures 1 and 3, and that the forward movement of the plate 21, with its shoulder 25 in engagement with the pin 41, urges parts to the dash-line position of Figure 3, whereupon the spring moves from the dot-dash line position 44' past the center of the pivot axis at 94 of the lever 4, as already described, and this movement past center snaps the lever 4 over into a position corresponding nearly to the full-line position of Figure 4, with the spring now in position shown by 44". The push-pull link 49 is pulled rearwardly by the force of the spring 44. This rearward movement throws the control lever L of the power take-off into its meshed position, and this occurs during the time that the plunger 10 and its stem 11 are pulled rearwardly by the actuation of the actuator, and while the clutch is declutched.

Immediately the valve at 8 is moved back to its "off" position, the plunger 10 of the actuator moves forwardly again, or to the left as shown in Figure 1, allowing the clutch to reengage, and allowing the rod 2 to be drawn rearwardly again under the influence of the spring 20. This merely insures the retention of the lever L in its meshed position, and the reengagement of the clutch, just described, causes resumption of the transmission of power through the transmission T and through the now-meshed gears of the power take-off at P. The jack shaft J is accordingly rotated, and any driven element at the rear end of the truck which is operatively connected thereto, such as the reel R or the pump (not shown), is driven by the jack shaft.

Whenever it is desired to stop such driving at the rear end of the truck, it is only necessary once more to throw the valve at 8 into the "on" position. There ensues rearward movement, as before, of the actuator's plunger 10 to declutch, and once more the parallel rod 2 is urged forwardly through the interposition of the rocking lever at 3. Now the engagement of the shoulder 26 with the pin 42 of the rocking lever 4 causes that lever to tilt on its pivot axis at 94, but oppositely to the preceding sense, until once more it is in the dash-line position of Figure 3, whereupon the spring 44 again snaps it past center and to the opposite side, thereby thrusting forwardly on the push-pull link at 49 and on the control lever at L. Such unmeshing of the power take-off occurs while the drive from the engine to the transmission, and hence to the power take-off, is again interrupted or declutched by depression of the clutch pedal C.

So it is that with each energization of the actuator 1, 10 declutching and either (and alternately) meshing or unmeshing of the power take-off occur simultaneously.

The pivoting of the plate 21 at 29 is a factor which assists in the snap-over action. This is true because the pin 27 which is the point of anchorage of one end of the spring 44, is thereby thrown slightly to the proper side of the axis 2' of the rod 2, as shown by the slightly divergent lines 27a and 27b, to cause an off-center pull on the spring when the lever 4 has reached a position precisely transverse to the axis at 2'.

The arrangement illustrated assumes that the power take-off is at the left side of the engine and its transmission. That is the usual case. In some instances the power take-off is on the right side, and where that is the case, owing to the location of the clutch pedal invariably at the left side, it will be necessary to effect some slight rearrangement of the elements or of the control mechanism, as for instance by separating the actuator and its stem 11, 14 and the push-pull rod 2, and adjusting the length of the rocking lever 3 or equivalent connection correspondingly. These, however, are mere details of design and do not affect the principles involved, which are adaptable to trucks of either type.

By using the mechanism described, the driver upon arrival at a delivery point may leave his engine idling, and go to the rear end compartment. There he can engage the pump with the engine through the power take-off, can regulate the engine speed by the throttle control of my companion case, can disengage the drive to the pump, resetting the throttle by the mechanism of the companion case, can engage the reel with the power take-off to reel in the hose, again with the correct throttle setting, disengage the reel from the engine, set the engine at idling speed, and only then, when he is through, has taken the delivery register's reading, and has closed the rear compartment, need he leave the rear end. All the numerous operations are controllable there, in various instances by remote controls such as the one which is the subject of this invention, and in other instances by controls and accessories which it would be difficult to operate or read from any other point. At no stage of the delivery operation need he leave the rear end, nor enter the cab.

I claim as my invention:

1. Control mechanism for a truck-mounted driven element which is located at a distance from the truck's engine, its clutch pedal, its power take-off and the control lever for such power take-off, and which is power-driven through such power take-off upon shifting of such control lever from disengaged or unmeshed position to engaged or meshed position, said control mechanism comprising a reciprocable actuator biased to remain normally in a given limit position but movable to its opposite limit position, an on-off control device located in the vicinity of said power-driven element, and operatively connected, when turned "on," to effect movement of said actuator to such opposite limit position, clutch pedal shifting means for connecting said actuator to the truck's clutch pedal, arranged for declutching movement of such pedal by movement of the actuator from its normal or given limit position, and means for interconnecting said actuator and the control lever of the power take-off to shift the latter, with each alternate reciprocation of the actuator into meshed and into unmeshed position, respectively, said interconnecting means including a reciprocable rod biased to return to one limit position, means engageable by the clutch pedal shifting means to shift said rod from its limit position with each declutching movement, and a reversible member and snap-over means to retain the same in each of two positions, said reversible member being positioned for engagement by and shiftable with said rod, and having means for connection to the power take-off control lever, to shift the latter, with movement of the reversible member from its one position, into engaged position coincident with declutching movement of the clutch pedal, and conversely, with movement of the reversible member from its other position, into disengaged position coincident with the next declutching movement of the clutch pedal.

2. Control mechanism as in claim 1, wherein the means connecting the actuator and the clutch pedal include lost-motion mechanism to permit pedal movement independently of the actuator, while the latter remains in its given limit position.

3. Control mechanism as in claim 1, wherein the clutch pedal shifting means includes a second rod disposed adjacent the aforementioned reciprocable and biased rod, said control mechanism including also a collar on each such rod, and a rocking lever constituting the rod-shifting means, pivoted between its ends in position to be engaged at one end by the collar on said second rod, and to engage by its other end the collar on the reciprocable and biased rod, to shift the latter from its one limit position.

4. Control mechanism as in claim 1, wherein the rod includes a portion guided for straight-line reciprocation and a forwardly extending plate pivotally mounted on said guided portion for limited transverse rocking, said plate having two transversely spaced shoulders, and wherein the reversible member includes a lever pivotally mounted between its ends substantially in alignment with the guided portion of the rod, but in position for cooperation with the plate's shoulders, abutments formed at the opposite ends of said lever for engagement with or by said abutments, to rock the lever, the means for connection to the power take-off being connected to said lever, and the snap-over means comprising a tension spring interconnecting said lever and said plate, between points adjacent the axis of the guided portion of the rod, and passing alternately to the opposite sides of such axis with successive reciprocations of the rod, thereby to rock the lever first to one side and then to the other.

CARROLL CLYDE CLOUGH.

References Cited in the file of this patent
UNITED STATES PATENTS

| Number | Name | Date |
|---|---|---|
| 2,195,030 | Irving | Mar. 26, 1940 |